United States Patent [19]
Phillips et al.

[11] Patent Number: 5,439,304
[45] Date of Patent: Aug. 8, 1995

[54] KEYBOARD

[75] Inventors: Michael Phillips, 16 Windermere La., Houston, Tex. 77063; Rodney H. Neumann, Houston, Tex.

[73] Assignee: Michael Phillips, Houston, Tex.

[21] Appl. No.: 156,103

[22] Filed: Nov. 22, 1993

[51] Int. Cl.⁶ ............................................. B41J 5/26
[52] U.S. Cl. ...................... 400/492; 400/488; 400/485
[58] Field of Search ............ 400/492, 491, 490, 491.1, 400/491.2, 488, 489, 485; 341/25, 22, 21, 20; 235/145 R

[56]  References Cited
U.S. PATENT DOCUMENTS

| 323,817 | 2/1992 | Büchin | D14/100 |
| 332,948 | 2/1993 | Barr | D14/115 |
| 4,467,150 | 8/1984 | Leitermann et al. | 400/488 |
| 4,480,932 | 11/1984 | Wilcox | 400/485 |
| 4,509,873 | 4/1985 | Ryan | 400/489 |
| 4,735,520 | 4/1988 | Suzuki et al. | 400/488 |
| 4,994,634 | 2/1991 | Tanji et al. | 341/25 |
| 5,067,834 | 11/1991 | Szmanda et al. | 400/489 |
| 5,141,343 | 8/1992 | Roylance et al. | 400/472 |

FOREIGN PATENT DOCUMENTS

| 2202821 | 8/1973 | Germany | 400/488 |
| 8400518 | 2/1984 | WIPO | 400/488 |

*Primary Examiner*—Edgar S. Burr
*Assistant Examiner*—Anthony H. Nguyen
*Attorney, Agent, or Firm*—Bush, Moseley, Riddle & Jackson

[57]  ABSTRACT

A keyboard assembly having keys which provide input signals to a processing unit includes a flexible printed circuit and underlying mat which enable the keyboard to be warped upward at its center by a system of cams which are driven by a controlled motor. Such warping induces rotation of the forearms of the user so as to have ergonomic value with respect to repetitive stress trauma.

10 Claims, 2 Drawing Sheets

FIG. 4
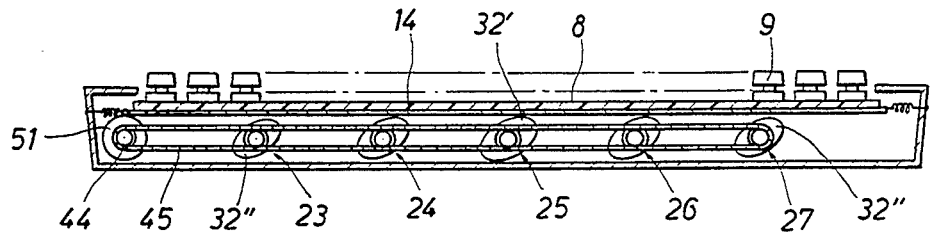
FIG. 5
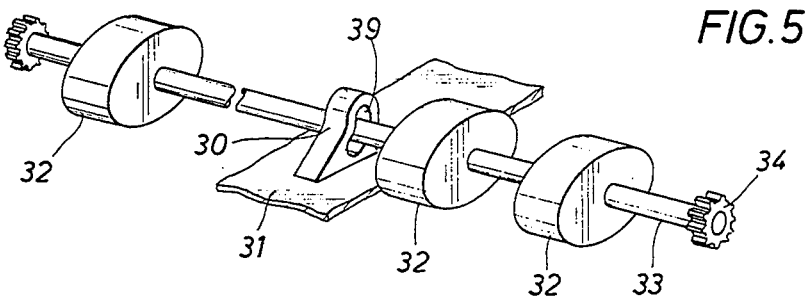
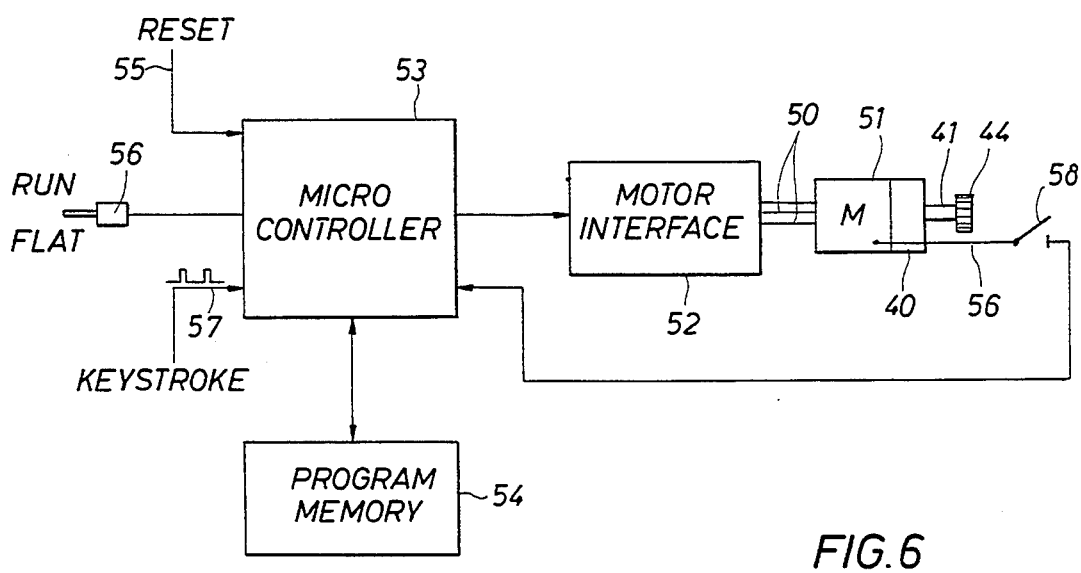
FIG. 6

KEYBOARD

FIELD OF THE INVENTION

This invention relates generally to a unique computer keyboard which can be warped or curved so that different sets of muscles and tendons of the user's hands and arms are used during a work day.

BACKGROUND OF THE INVENTION

Use over a long period of work time of an input keyboard to a computer can cause repetitive stress trauma to the operator's fingers, hands, wrists and shoulders. Such trauma can lead to a range of problems comprising mild discomfort, tendinitis, bursitis, stiffness, and even to carpal tunnel syndrome which may require surgical repair. Although a number of different keyboard designs have been directed to this problem (see Ger. No. 552,661; Ryan IPA WO 84/00518; Diefuisse Pat. No. 4,824,268; Rollesonel Pat. No. 5,029,260 and Freig Pat. No. 4,483,634) none of these devices is known to have been widely used.

Thus there is a continuing need for improvement in this biotechnological area, because input keyboards are becoming so widespread that troubles with hands, arms, shoulders and joints of users can be expected to increase dramatically.

A general object of the present invention is to provide a new and improved keyboard for a computer, typewriter, and the like which can automatically change shape during use so as to require a user to change muscles and tendons used during a work day so as to decrease chances of a user experiencing repetitive stress trauma.

Another object of the present invention is to provide a new and improved computer keyboard which is warped upward from its sides toward the center during use thereof to induce forearm rotation of the user.

Another object of the present invention is to provide a new and improved computer keyboard in which a cam system warps it upward at its center in order to induce slight adjustments to a user's arms and shoulders in order to prevent the user from repeating the exact same motions over the course of a long work period.

SUMMARY OF THE INVENTION

These as well as other objects of the present invention are achieved in accordance with the concepts of the present invention through the provision in a preferred embodiment, of a keyboard constructed with a flexible printed circuit material so that the board can be flexed considerably without affecting proper operation of the key contacts. Such flexible keyboard is supported by a mechanical suspension system which modulates the shape of a mat which suspends the flexible keyboard. In a preferred embodiment, the mat raises and lowers the elevation of the center of the keyboard, which will affect the user by causing reactive rotations of the forearms. The shape of the mat is responsive to a cam assembly which is driven by a motor. A control device for the motor can be incorporated in the keyboard or in a separate control device.

The keyboard has a "home" position which is the flat position similar to any other keyboard. When "warping" is produced by the cams and mat, the elevation from column to column of the keys is modulated. The force transmitted to the cam from the motor is controlled to cause very small incremental changes in the warp of the keyboard. The motion of the keyboard warping is very slow and essentially not perceivable to the user. Apparatus is provided for creating random warping of the keyboard through the course of a work day.

BRIEF DESCRIPTION OF THE DRAWINGS

The present invention has other objects, features and advantages which will become more clearly apparent in connection with the following detailed description of a preferred embodiment, taken in conjunction with the appended drawings in which:

FIG. 4 is a sectional view taken on line 4—4 of FIG. 3, and also showing the key caps and switch means;

FIG. 5 is an isometric view of one of the cam assemblies which jointly cause warping of the keyboard; and FIG. 6 is a diagram of a motor and control circuit which can be used with the present invention.

DETAILED DESCRIPTION OF A PREFERRED EMBODIMENT

Figure 1:
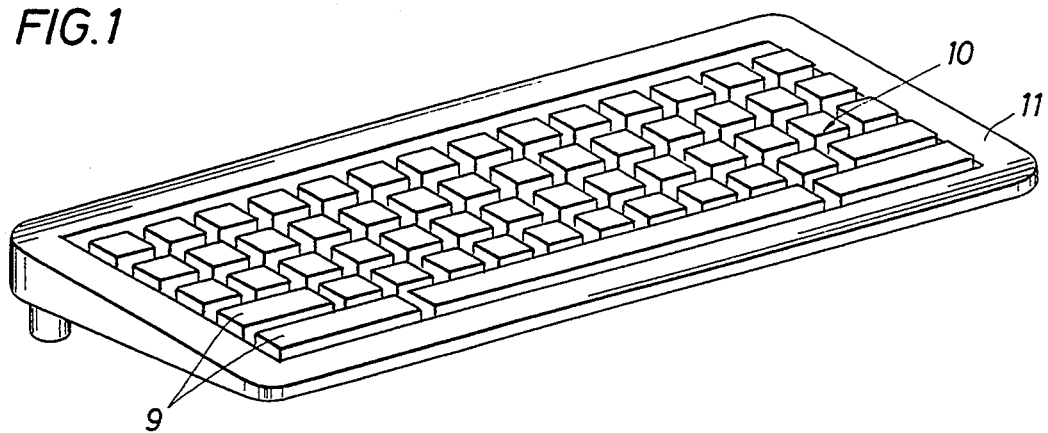
FIG. 1 is a perspective view of a typical keyboard.

Referring initially to FIG. 1, a computer input device or keyboard indicated generally at 10 has one or more keyfields which are mounted in support frame 11. The keyfields comprise groups of individual keys 9 that, when depressed, deliver an electrical signal to a data input device such as the control processing unit of a word processor machine such as a typewriter. The support or chassis 11 typically is made of a molded, rigid plastic, and generally has a rectangular overall shape. Typically the chassis is constructed such that the keyboard 10 is somewhat higher at its rear than at its front in order to slant upwardly from front to back.

Figure 2:
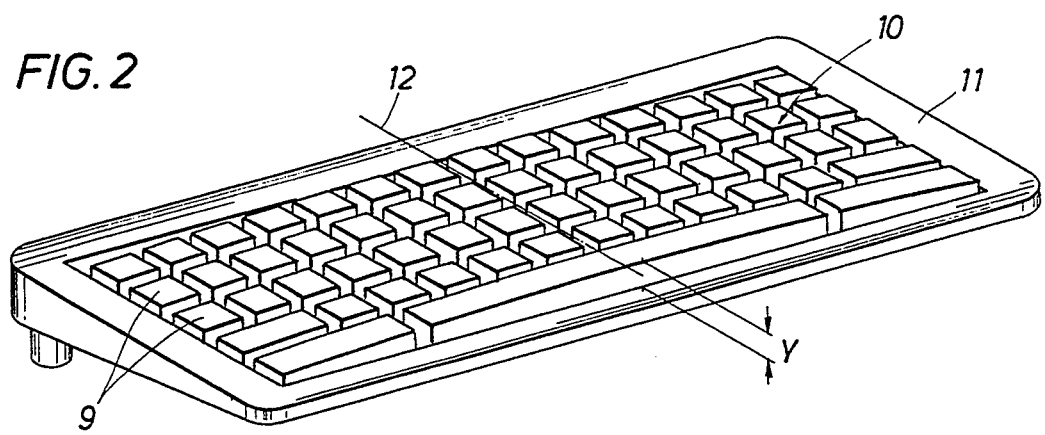
FIG. 2 is a view similar to FIG. 1, but with the plane of the keys being warped upward along its longitudinal extent in accordance with this invention.

As shown in FIG. 2, the keyboard 10 has been warped upward to a maximum vertical displacement y at its center line 12 in accordance with a principle aspect of this invention. How such warping is accomplished is described below.

Generally speaking, input keyboards used in standard office equipment employ fiberglass printed circuit boards as the electrical network for the key array which serve as the mechanical substrate that embodies or supports the keyswitch electrical contacts. However, because fiberglass is quite stiff, this invention substitutes a flexible plastic material such as "Mylar" for fiberglass. With such a substrate 8 (FIG. 4), it becomes possible to flex the keyboard 10 considerably without adverse effect on proper operation of the key contacts 9. In addition, such flexible substrate 8 is supported by a spring-tensioned, flexible mat 14 as shown in FIGS. 3 and 4.

Figure 3:
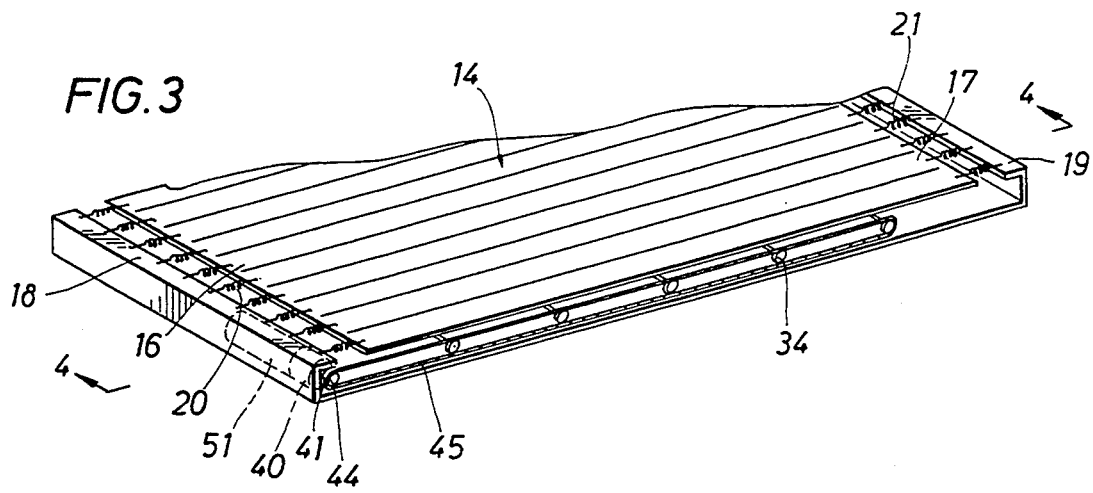
FIG. 3 is a fragmentary perspective view of the substructure of the keyboard in accordance with the present invention, i.e. with its key caps and switch means removed.

As shown in greater detail in FIG. 3, the mat 14 is a generally rectangular, compliant member which has its opposite ends 16, 17 attached to respective end pieces 18, 19 (preferably of plastic) of the keyboard frame 11 by pluralities of springs 20, 21 which hold the mat under a degree of tension while enabling the keyboard to be warped as illustrated and described above. To provide precisely controlled warping, a plurality of cam sets 23-27 are mounted on pillow block bearings 30 (FIGS.

4 and 5) which are fastened to or molded with the bottom floor 31 of the keyboard frame. Each cam assembly includes a plurality of longitudinally spaced, oval cams 32 which are fixed for rotation on a drive shaft 33 which has a gear 34 on at least one of its ends. The sets of cams vary in size from the largest ones 32′ in the center of the mat 14 to the smallest ones 32″ adjacent the sides thereof. As the cams are jointly rotated by the shafts 33, the mat 14 and the flexible keyboard printed circuit are gradually warped upward in the center into the configuration shown in FIG. 2. Of course additional rotation of the cam sets 25–27 will enable the mat 14 to assume its normally flat shape. Each bearing 30 has a vertically elongated slot 39 as shown in FIG. 5 to allow the shafts 33 to shift vertically as the cams are turned. Although only one bearing 30 is shown in the drawings, it will be apparent that several bearings are located along each shaft 33 between the cams 32, as well as outside the end cams.

In order to jointly rotate the cam sets 23–27, the electric motor 51 shown in phantom lines in FIG. 3 is connected via a gear reduction unit 40 to an output shaft 41. A gear 44 on the shaft 41 meshes with a drive belt 45 which engages upper and lower teeth on the gears 34 on the outer ends of the shafts 33 which mount the cam sets 23–27. Thus the cams are all simultaneously driven. If desired, drive gears also can be fixed to the opposite ends of the shafts 33 so that another belt and/or motor can be used.

As shown in FIG. 6, power signals are fed through leads 50 from an interface 52 to control the motor 51. Input signals are provided to the interface 52 from a microcontroller 53 having a program memory 54. A signal via lead 55 can be used to reset the controller 53, and a switch 56 can be used to signal the computer 53 to cause warping of the keyboard to occur, or to cause it to remain flat. A keystroke count signal input 57 also can be used to control the rate at which warping occurs, as a function of whether the keyboard has been used only intermittently during a day, or practically continuously and at a high rate of keystrokes over a long day. Programming of computer 53 to accomplish such tasks is well within the ordinary skill of a micro computer designer. For example, the program in computer 53 may include code for three main steps. First, a polling routine may be used to detect keystroke signals 57. Second, once a non-null keystroke signal is detected from keystroke 57, the motor interface 52/motor 51 is incremented by a step. Third, the program pauses for a specified time and goes back to polling again.

In the preferred embodiment of the invention, a lead 56 of motor 51 and a reference limit switch 58 are shown schematically to illustrate generation of a signal when the motor 51 reaches a "home position". Such switch 58 closes when the motor 51 reaches such home position. Such optional reference limit switch 58 is advantageous when the controller 53 is powered-up when the motor 51 is not in the home position. The controller 53 can be programmed to rotate the motor 51 until switch 58 signals that motor 51 has reached home position.

OPERATION

The keyboard 10 is assembled as shown in the drawings, including a flexible, printed circuit substrate 8 which, together with flexible mat 14 and springs 20, 21, support the field of keys 9. Because of the compliance of these members, the shape of the surface of the keyboard can be modulated by the mechanical system of cams 32 shown in the drawings. The keyboard 10 initially is in its flat condition as shown in FIG. 1, and the operation of the invention enables the keyboard 10 to be slowly warped upward to the position shown in FIG. 2 to cause reactive rotations of the user's forearms.

To accomplish such warping, the small D.C. motor 51, or equivalent device, is continually stepped incrementally to a new position where the drive train, which includes the gears 44, 34, the drive belt 45 and the cam sets 23–27 transmits motive force which warps the mat 14 that supports the flexible keyboard 10. It is particularly desirable to warp the center of the keyboard 10 upward and downward relative to the left and right extreme columns or keys thereon to induce forearm rotation of the user. In the preferred embodiment, such differential elevation from column to column of keys 9 is achieved.

The program stored in memory 54, which is responsible for controlling the power to the motor 51, preferably causes very small incremental changes in the shape of the keyboard 10 each time it executes the proper electrical drive to the motor 51 to briefly move in a selected direction of rotation. Over a relatively long period of time, such motor movements accumulate to provide a noticeable change in the shape of the keyboard 10. However, such changes individually are so slow that they are not readily even perceivable. These motions can be randomized so that they are not periodic or repetitive motions. Random or pseudo-random number generation can be used in the controller programming so that a smooth warping function does not repeat itself during a long working day.

As noted above, it can be useful to have the speed of modulation of the keyboard 10 affected by the amount of keyboard activity. Where a user is typing fast and unceasingly, the automatic modulation of the board should be correspondingly more active. If the keyboard 10 is dormant, the modulator may hold its position, or even gradually return to the flat, or home, position. Varying levels in between these extremes may cause correspondingly active modulation.

It now will be recognized that a new and improved input keyboard has been provided which provides biotechnological benefits to a user. Since certain changes or modifications may be made in the disclosed embodiment without departing from the inventive concepts involved, it is the aim of the appended claims to cover all such changes and modifications falling within the true spirit and scope of the present invention.

What is claimed is:

1. A keyboard assembly having keys defining a keyboard for use in providing input signals to a processing unit, comprising:
    flexible circuit means forming a substrate of said keyboard;
    a flexible mat supporting said substrate;
    resilient means for connecting said mat to said keyboard; and
    automatically controlled means for warping said mat and said substrate upward in a central portion thereof during lengthy use of said keyboard in order to induce forearm rotation of the user.

2. The keyboard assembly of claim 1 wherein:
    said mat has a lower surface, and
    wherein said automatically controlled means includes a plurality of cam means bearing against said lower surface of said mat for conforming the overall shape of said mat to the highest surface on said cam means.

3. The keyboard assembly of claim 2 wherein said cam means includes:
individual groups of cams mounted on common shafts; and means for jointly driving said shafts and groups of cams in a controlled manner.

4. The keyboard assembly of claim 3 wherein said driving means includes:
electric motor means for driving said shafts; and
controller means for causing intermittent operation of said electric motor means.

5. A keyboard assembly having an array of keys used to provide input signals to a processing unit, said keyboard having a rigid frame including end members and a floor, comprising;
flexible substrate means forming electrical circuits for said keys;
a generally rectangular, flexible mat underlying and supporting said substrate and having a central portion extending from front to rear of said substrate;
resilient means connecting said mat to said end members to hold said mat taunt over said floor; and
controlled means for automatically warping said central portion of said mat and said substrate overlying said central portion upwardly in order to induce forearm rotation of a user who is operating said keyboard.

6. The keyboard of claim 5 wherein said controlled means includes:
a plurality of laterally spaced series of cam means arranged parallel to one another so that the center series of said cam means underlies said center portion of said mat and substrate;
said center series of said cam means providing a greater warping effect than others of said cam means.

7. The keyboard of claim 6 wherein:
said series of cam means which are located to the sides of said center series have progressively reduced heights to achieve a reduction in warping in a uniform manner.

8. The keyboard of claim 7 wherein:
each of said series of cam means is mounted on a shaft having a driven gear on an outer end thereof;
said controlled means further including electric motor means having an output shaft and a drive gear thereon; and
belt means are provided for coupling said drive gear to each of said driven gears simultaneously so that said warping occurs uniformly over said keyboard.

9. The keyboard of claim 8 further including:
programmable means for controlling the power to said electric motor means in a manner such that its rotation causes very small incremental changes in the warping of said keyboard.

10. The keyboard of claim 8 further including:
means for modulating the power input to said motor depending upon how fast and unceasing a user is operating said keyboard.

* * * * *